United States Patent [19]

Martinez et al.

[11] 3,923,472

[45] Dec. 2, 1975

[54] FUEL MADE FROM THERMOPLASTIC FIBERS AND OIL

[75] Inventors: Boni Philip Martinez, Wilmington, Del.; Millard David Zeisberg, Elkton, Md.

[73] Assignee: E. I. Du Pont de Nemours and Company, Wilmington, Del.

[22] Filed: Oct. 5, 1973

[21] Appl. No.: 403,863

[52] U.S. Cl. .................. 44/50; 44/62; 44/71; 44/80; 210/23; 210/DIG. 21
[51] Int. Cl.² ......................................... C10L 1/00
[58] Field of Search ........ 44/50, 62, 71, 80; 210/23, 210/DIG. 21

[56] References Cited
UNITED STATES PATENTS

| | | | |
|---|---|---|---|
| 3,667,608 | 6/1972 | Burroughs et al. | 210/DIG. 21 |
| 3,750,600 | 8/1973 | Ohsol et al. | 110/1 R |

FOREIGN PATENTS OR APPLICATIONS

| | | | |
|---|---|---|---|
| 7,204,521 | 10/1972 | Netherlands | 44/50 |

Primary Examiner—Delbert E. Gantz
Assistant Examiner—I. Vaughn

[57] ABSTRACT

A process and system for filtering oil from a liquid containing oil by passing the liquid through a filter containing melt-spun thermoplastic synthetic fibers for absorbing the oil. When the fibers become saturated with oil, they are heated at an elevated temperature until they become liquid. The resultant liquid is then drawn from the filter for use as fuel.

8 Claims, 1 Drawing Figure

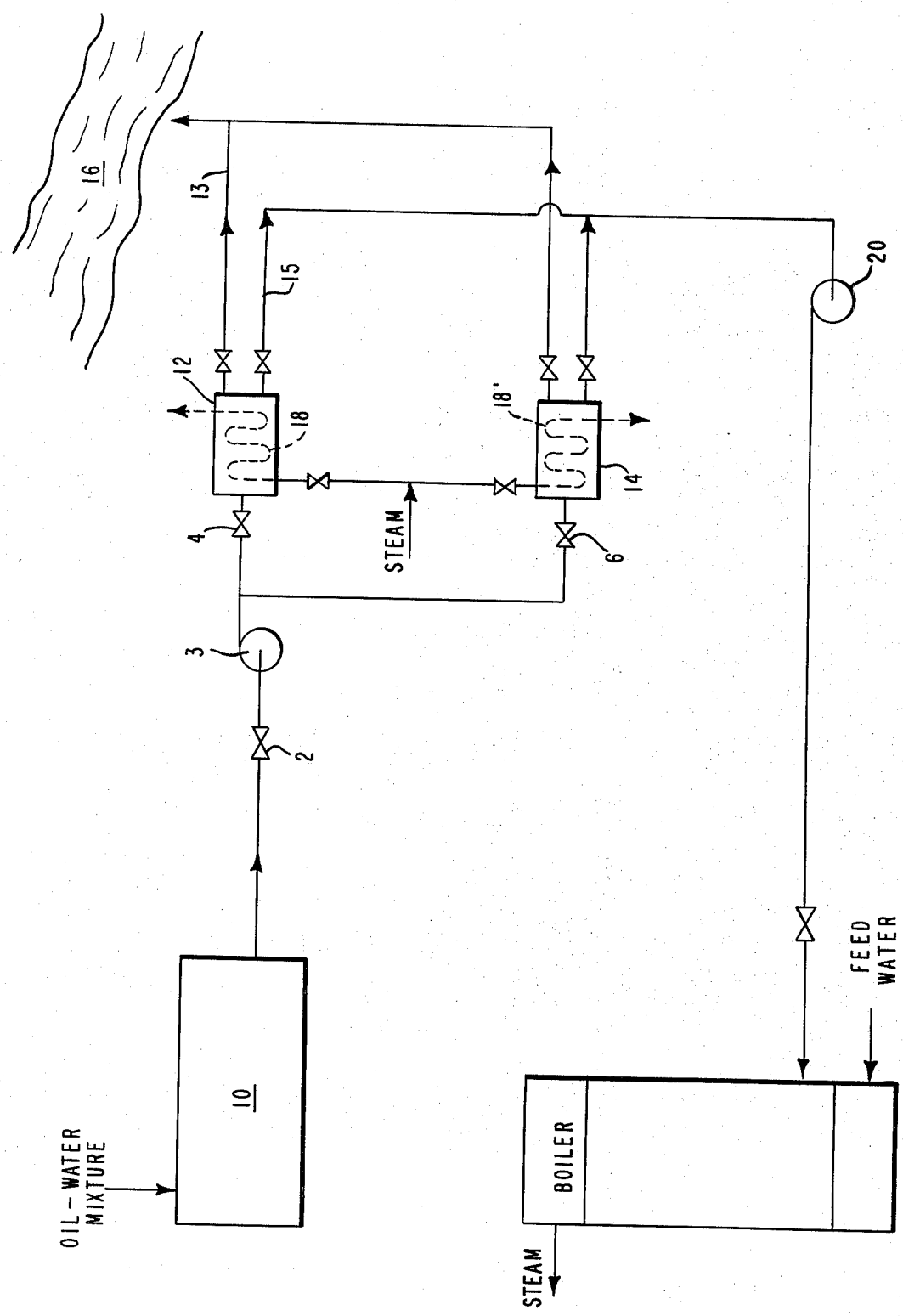

FUEL MADE FROM THERMOPLASTIC FIBERS AND OIL

BACKGROUND OF THE INVENTION

This invention concerns the use of synthetic fibers for absorbing oil. Specifically, the invention is a process and system for converting melt-spun synthetic fibers containing absorbed oil into a liquid suitable for use as a fuel.

The use of synthetic polymeric fibers to absorb oil is well known. Much effort has been directed to the clean-up of oil spills from the surface of water, and the use of synthetic polymeric materials for this purpose has been illustrated. Disposal of the oil-bearing synthetic polymeric material receives little attention, although some of the patents do suggest that oil may be removed by squeezing the polymeric material. Efficiency of oil pick-up by the synthetic material decreases after an initial use, and it has often been found expedient to discard the material rather than attempting to reuse it.

Synthetic fibers have also been used as filters to remove small amounts of oil from oil-water mixtures. In these cases too, the filter is usually discarded rather than being cleaned and reused.

Disposal of the oil-bearing synthetic materials has been a continuing problem, particularly in the case of large oil spills as, for example, from an oil tanker. Ecological considerations require that the oil-polymeric material mixture be disposed of in some way which is not harmful to the environment. Thus far, no satisfactory way has been developed. It is the purpose of this invention to describe a process for the disposal of oil-bearing synthetic polymeric material which converts such material to a liquid suitable for use as a fuel.

SUMMARY OF THE INVENTION

A process for converting melt-spun synthetic fibers containing absorbed oil into a liquid suitable for fuel, said process comprising: absorbing oil by said fibers until said fibers become saturated with oil and then heating the oil saturated fibers to a temperature of from about 110° to about 150°C. until said saturated fibers change to a liquid state.

This invention also includes a system for separating oil from water in an oil-water mixture and disposing of said oil, said system comprising: a source of said oil-water mixture; a filter containing synthetic fiber filter material capable of absorbing oil from said oil-water mixture; heating means associated with said filter for raising the temperature of said filter material to convert fibers saturated with oil into a liquid oil-fiber mixture, said filter having separate outlets, one for filtered water, the other for said liquid oil-fiber mixture; means for pumping said oil-water mixture from said source to said filter and for pumping filtered water from said filter; and means for pumping said liquid oil-fiber mixture from said filter.

BRIEF DESCRIPTION OF THE DRAWING

A schematic flow diagram of the system encompassing the process of this invention.

DETAILED DESCRIPTION OF THE PREFERRED EMBODIMENTS

The drawing schematically illustrates a system utilizing one embodiment of the present invention. A mixture of oil and water from a settling basin 10 is directed through valves 2, 4 and 6 by pump 3 into two filter boxes 12, 14. The filter boxes are arranged so that one is on line while the other is on a stand-by basis. For example, the oil-water mixture passes through the filter box 12 and the oil is absorbed by synthetic fibers (less than 100 denier per filament) in the filter box and retained, while essentially oil-free water is returned to the stream 16 through pipe 13 attached to one outlet of filter 12. When the first filter 12 becomes saturated with oil, the oil-water stream is directed into the second filter box 14 by means of the valves 4, 6, i.e., by closing valve 4 and opening valve 6. After removal of the oil-saturated filter 12 from service, the entire filter is heated with steam by means of steam coil 18 in filter box 12 to convert the fiber-oil mixture into a liquid. Advantageously, the temperature may be maintained on the liquid to insure that it will remain pumpable. This liquid is then pumped by pump 20 through pipe 15 from the other outlet of filter 12 to a boiler where it is used to generate steam. The procedure is repeated using steam coil 18 to heat filter 14 when it becomes saturated with oil.

Synthetic fibers will absorb many times their own weight of oil, depending on type and composition. Typical numbers are 30–35 for polyester and 10–170 for polyolefins. The oil polymeric material mixture may be converted to a liquid by heating at atmospheric pressure or above, using temperatures in the range from 110°–300°C. The process may be used with a wide variety of oils, including crude oil, fuel oil, used motor oil and light oils such as textile finishes. The process also may be useful in the disposal of waste synthetic fibers.

A similar process can be envisioned for collection of oil from oil spills at sea. In this case, the fibers, after absorption of oil, would be transferred to a holding tank on board ship. Heating the oil-fiber mixture would convert the mass to a liquid where it could either be used as fuel on board ship or transported back to shore and pumped into a tank for subsequent use.

Fibers useful in the practice of this invention include polyamides, polyesters and polyolefins. Fibers are the preferred form because of the large surface area for oil absorption. Fibers have significant advantages over other shaped articles both in efficiency of oil absorption and in ease of dissolving to form a liquid. The absorption efficiency is related to the large surface area and to good packing in the filters. It is surprising that fibers dissolve much more easily in oil than do shredded or comminuted thermoplastics, generally dissolving in less than 30 minutes at temperatures of 200°C. or less. No catalyst is required to hasten the solution. This is particularly surprising in view of the known crystallinity of drawn fibers, which would predict that they should dissolve less easily than more amorphous plastic materials.

EXAMPLE I

Fibers of spun-bonded polyethylene (Tyvek) at about 1 weight percent begin to dissolve in motor oil at 110°C. and are completely dissolved at 130°C.

EXAMPLE II 97 grams of No. 6 fuel oil were heated in a beaker, and as the temperature passed 150°C., 48 grams of polyester fiber 6 dpf ½ inch cut were added slowly until after 15 minutes, at 210°C., the combination of oil and fibers was in a liquid state with no solids observable at which time the beaker was removed from the heat source. Next morning at room temperature, it was unexpectedly observed that the fibers had not precipitated, the combination being still a liquid with a viscosity apparently only slightly greater then that of No. 6 fuel oil alone. Therefore, the combination of No. 6 fuel oil and polyester fibers at this concentration is pumpable at room temperature.

EXAMPLE III

To 600 ml. of water in a 1000 ml. beaker, approximately 150 ml. of S.A.E. 20 motor oil were added and vigorously agitated together at room temperature. About 10 grams of 1.5 dpf polyester fibers 1½ inch cut were added and stirred thoroughly in the oil-water combination. The fibers were removed, and it was observed that less than half of the oil remained in the beaker. Water was decanted from the fibers containing absorbed oil, and then the fiber mass was melted down in about 10 minutes with a Bunsen burner. After retention at room temperature overnight, it was surprising and unexpected to observe that the fibers had not precipitated from the oil.

EXAMPLE IV

To 50 grams of No. 6 fuel oil in a beaker were added 10 grams of spunbonded polyethylene and the combination became all liquid at only 120°C. after heating for 15 minutes. After cooling to room temperature, the 60 grams of starting material weighed 59 grams but the resultant material had become hardened and therefore quite unpumpable, at room temperature. To have a pumpable combination, polyethylene with No. 6 fuel oil at these concentrations will need to be at least about 120°C.

What is claimed is:

1. A process for removing oil from the surface of water and for converting thermoplastic synthetic fibers into a liquid suitable for fuel, said process comprising: placing said fibers on said surface and absorbing oil by said fibers until said fibers become saturated with oil and then heating the oil saturated fibers to a temperature sufficient to change said saturated fibers to a liquid state.

2. The process as defined in claim 1, including the additional step of maintaining said liquid at about said temperature while pumping it for disposal.

3. The process as defined in claim 2, said fibers being polyethylene and about 16 weight percent of the fibers saturated with oil mixture, said oil being No. 6 fuel oil, said temperature being about 120°C.

4. The process as defined in claim 1, said fibers being polyethylene and one weight percent of the fibers saturated with oil mixture, said oil being motor oil, said temperature being from about 110° to about 130°C.

5. A process for filtering with and converting thermoplastic synthetic fibers into a liquid suitable for fuel, said process comprising: passing an oil-bearing liquid mixture through said fibers until said fibers become saturated with oil and then heating the oil saturated fibers to a temperature sufficient to change said saturated fibers to a liquid state.

6. The process as defined in claim 5, including the additional step of maintaining said liquid at about said temperature while pumping it for disposal.

7. The process as defined in claim 6, said fibers being polyethylene and about 16 weight percent of the fibers saturated with oil mixture, said oil being No. 6 fuel oil, said temperature being about 120°C.

8. The process as defined in claim 5, said fibers being polyethylene and one weight percent of the fibers saturated with oil mixture, said oil being motor oil, said temperature being from about 110° to about 130°C.

* * * * *